(12) United States Patent
Arhab et al.

(10) Patent No.: US 7,708,126 B2
(45) Date of Patent: May 4, 2010

(54) HYDROKINETIC COUPLING DEVICE INTENDED, IN PARTICULAR, FOR A MOTOR VEHICLE

(75) Inventors: Rabah Arhab, St Brice Sous Foret (FR); Norberto Termenon, Amiens (FR); Daniel Bonnel, Amiens (FR)

(73) Assignee: Valeo Embrayages, Amiens Cedex (FR)

( * ) Notice: Subject to any disclaimer, the term of this patent is extended or adjusted under 35 U.S.C. 154(b) by 1325 days.

(21) Appl. No.: 10/523,826

(22) PCT Filed: Aug. 6, 2003

(86) PCT No.: PCT/FR03/02470
§ 371 (c)(1),
(2), (4) Date: Jul. 14, 2005

(87) PCT Pub. No.: WO2004/015307
PCT Pub. Date: Feb. 19, 2004

(65) Prior Publication Data
US 2009/0223767 A1 Sep. 10, 2009

(30) Foreign Application Priority Data
Aug. 6, 2002 (FR) .................................. 02 09974

(51) Int. Cl.
*F16H 45/02* (2006.01)

(52) U.S. Cl. .................. 192/3.3; 192/70.12; 192/70.17; 192/212; 192/113.34

(58) Field of Classification Search .................. None
See application file for complete search history.

(56) References Cited

U.S. PATENT DOCUMENTS

| | | | |
|---|---|---|---|
| 5,964,329 A * | 10/1999 | Kawaguchi et al. .......... 192/3.3 |
| 5,975,261 A | 11/1999 | Woerner et al. |
| 6,231,472 B1 | 5/2001 | Sudau et al. |
| 6,244,401 B1 * | 6/2001 | Maienschein et al. ........ 192/3.3 |
| 6,354,413 B2 | 3/2002 | Heller et al. |
| 7,225,908 B2 * | 6/2007 | Back et al. .................. 192/3.3 |
| 2003/0178275 A1 | 9/2003 | Mencher et al. |

* cited by examiner

Primary Examiner—Richard M. Lorence
(74) Attorney, Agent, or Firm—Berenato & White, LLC

(57) ABSTRACT

A hydrokinetic coupling device is intended, in particular, for a motor vehicle. The hydrokinetic coupling device comprises a casing rotationally connecting a driving shaft and an impeller wheel, a turbine wheel fixed to a turbine hub rotationally connected to a driven shaft, a clutch locking the coupling of the driving and driven shafts, and a damping element comprising elastic washers for restricting the essentially-radial circulation of the fluid at least inside a front axial space which is located between a front guide washer and a web, such that the fluid circulates though the lockup clutch of the device.

20 Claims, 7 Drawing Sheets

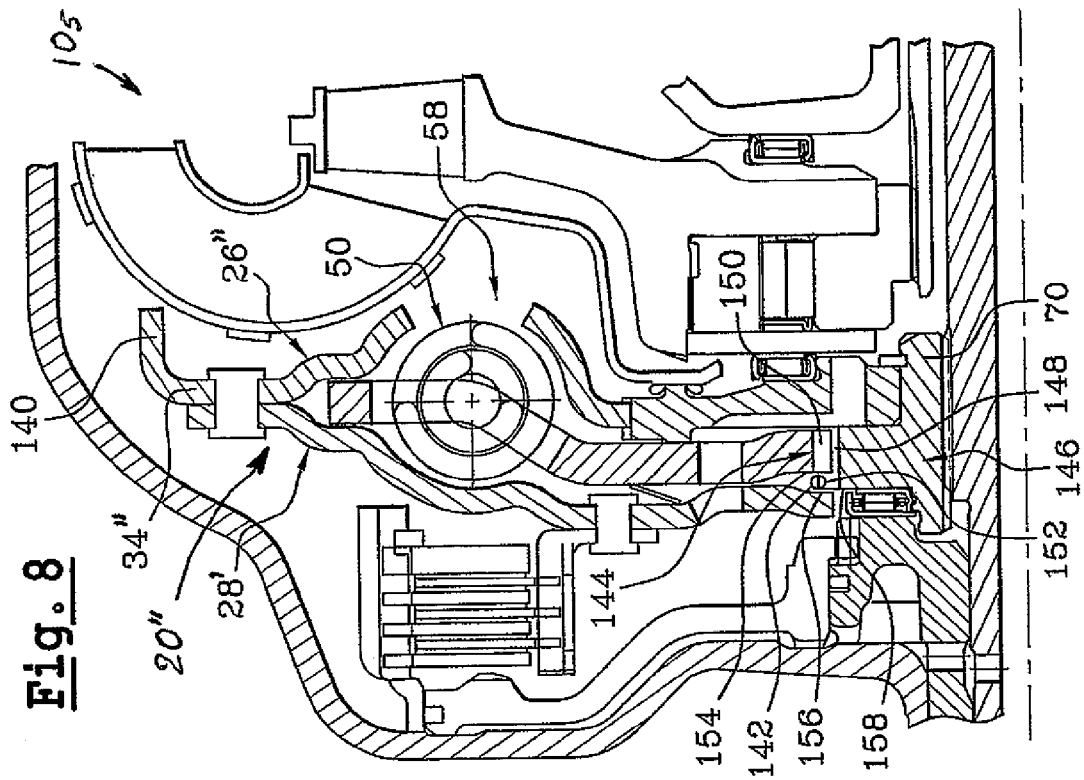
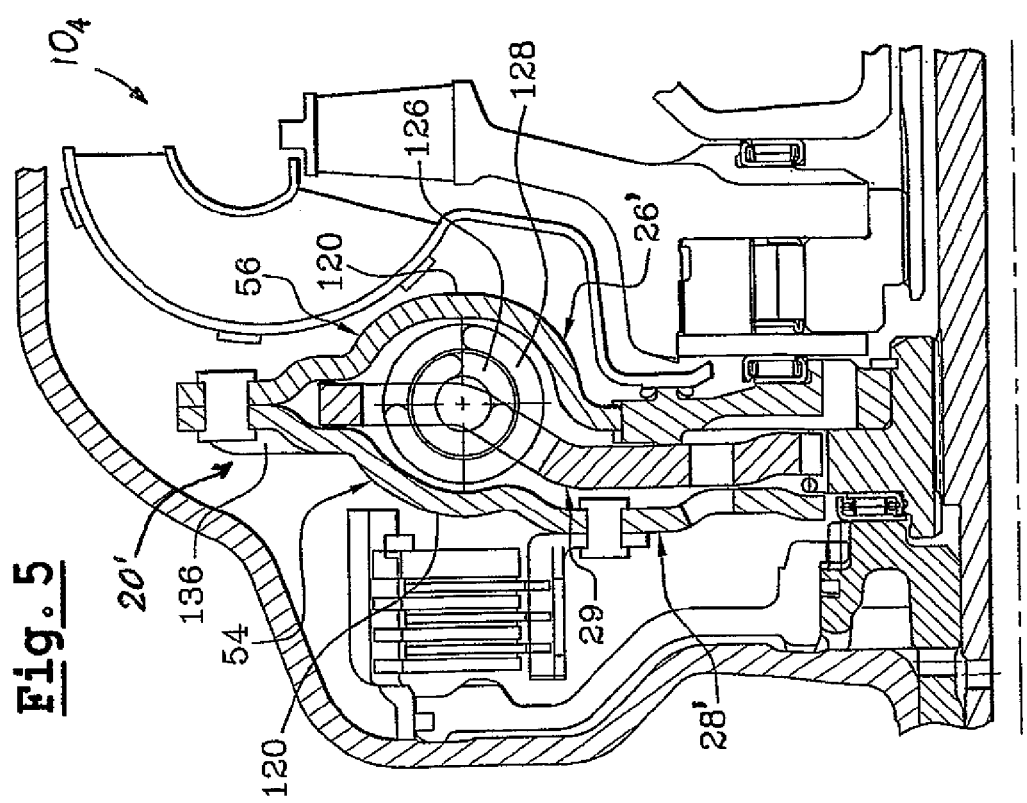

HYDROKINETIC COUPLING DEVICE INTENDED, IN PARTICULAR, FOR A MOTOR VEHICLE

The present invention concerns a hydrokinetic coupling device (or hydrokinetic coupling appliance), in particular for a motor vehicle.

There is already known in the prior art, for example from the documents FR-A-2.765.939 and U.S. Pat. No. 5,975,561, a hydrokinetic coupling device, in particular for a motor vehicle, of the type comprising:
- a casing formed from a first shell which rotationally connects a driving shaft and an impeller wheel;
- a turbine wheel rotationally fixed, by a connection without play, to a turbine hub which is able to be rotationally connected to a driven shaft;
- a clutch locking the coupling of the driving and driven shafts, comprising a piston, able to move axially in order to disengageably connect a second shell of the casing to the driven shaft, clamping at least one friction disc rotationally fixed firstly to the second casing shell by means of a first connecting piece and secondly to the input element of a damping device by means of a second connecting piece;

of the type in which the damping device comprises circumferentially acting elastic members interposed between two guide washers forming the input element and a damper plate forming the output element and which is rotationally fixed to the driven shaft, the input and output elements being rotationally connected with a capacity for angular movement which is limited by stop means, and of the type comprising a channel supplying the casing with fluid and a channel discharging the fluid.

These hydrokinetic coupling appliances are of the "three-channel" type, that is to say the hydraulic circuit of each appliance comprises a first channel for supplying fluid to the converter, a second discharge channel, and a third channel, independent of the first and second channels of the converter, which supplies the control chamber of the locking clutch piston with a view to moving the piston axially.

Generally, the supply channel brings the fluid into the converter, between the impeller wheel and the turbine wheel, and then the fluid is discharged from the converter through the outside, passing through the radial space between the turbine wheel and the second shell of the casing.

The fluid then circulates radially towards the inside, in the axial space between the turbine and the second shell, in order to be discharged through the discharge channel, which is for example arranged between the driven shaft and a reaction sleeve carrying a central reaction wheel.

Being directed towards the discharge channel, the fluid passes radially through the lock-up clutch, which comprises radial openings for this purposes, and circulates radially and axially inside the damping device.

When the clutch is locked and when it is a slipping phase, that is to say when the piston is controlled in the direction of its engagement against the friction discs, it is necessary, for cooling the clutch, for the greatest possible quantity of fluid to pass through the clutch.

However, it has been found that a large quantity of fluid passes through the axial space between the clutch and the turbine wheel, passing through the damping device, without passing through the clutch, which is detrimental to the cooling of the clutch.

This phenomenon is all the more prevalent when, during the functioning of the coupling appliance, under the pressure of the fluid, the casing deforms by "swelling", which increases the size of the axial space between the clutch and the turbine wheel.

The invention aims in particular to remedy this drawback, by proposing a simple and economical solution.

For this purpose, the invention proposes a hydrokinetic coupling device (hydrokinetic coupling appliance), in particular for a motor vehicle, of the type comprising:
- a casing formed from a first shell which rotationally connects a driving shaft and an impeller wheel;
- a turbine wheel rotationally fixed, by a connection without play, to a turbine hub which is able to be rotationally connected to a driven shaft;
- a clutch locking the coupling of the driving and driven shafts, comprising a piston, able to move axially in order to disengagably connect a second shell of the casing to the driven shaft, clamping at least one friction disc rotationally fixed firstly to the second casing shell by means of a first connecting piece and secondly to the input element of a damping device by means of a second connecting piece;

of the type in which the damping device comprises a circumferentially acting elastic member interposed between two guide washers forming the input element and a damper plate forming the output element and which is rotationally fixed to the driven shaft, the input and output elements being rotationally connected with a capacity for angular movement which is limited by stop means, and of the type comprising a channel supplying the casing with fluid and a channel discharging the fluid, characterized in that the damping device comprises means for restricting the circulation of the fluid in a roughly radial direction, at least inside the front axial space, which is situated between the front guide washer and the damper plate, so as to promote the circulation of fluid, from the supply channel to the discharge channel, through the lock-up clutch.

According to other characteristics of the invention:
- the means for restricting the circulation of fluid comprise at least one axial-effect front elastic washer which is interposed axially between the damper plate and the front guide washer, so as to form a barrier against the radial circulation of the fluid inside the front axial space of the damping device;
- the means for restricting the circulation of fluid comprise at least one axial-effect rear elastic washer which is interposed axially between the damper plate and a facing radial surface towards the rear, and which is disposed radially inside, with respect to the elastic members, so as to form a barrier against the radial circulation of the fluid inside the rear axial space, situated between the damper plate and the rear guide washer;
- each elastic washer is a frustoconical washer;
- the elastic washer is centered with respect to the axis by means of a complementary centering profile which is produced in the associated guide washer, or in the damper plate;
- the centering profile comprises several strikes forming, on the associated guide washer or on the damper plate, angularly distributed centering reliefs;
- the rear guide washer is rotationally fixed to the turbine hub;
- the rear guide washer and the turbine hub are rotationally integral by meshing, by means of teeth which are carried respectively by the internal periphery of the rear guide washer and by the external periphery of the turbine hub;

the turbine hub comprises a continuous annular radial surface which comes into axial abutment against the rear face of the damper plate so as to prevent the radial circulation of the fluid inside the rear axial space;

the rear elastic washer is interposed axially between the damper plate and the front face of the turbine hub;

the surface of the turbine hub liable to be in contact with the rear elastic washer, and/or the elastic washer, is treated with a view to increasing its hardness;

the central part of the front guide washer and/or the central part of the rear guide washer, which is situated in line with the elastic members, is solid, by virtue of which the fluid cannot flow in the associated axial space by passing through the central part of the guide washer;

the damping device comprises pairs of cups which are arranged in the central parts of the guide washers so as to form abutment surfaces for the circumferentially acting elastic members;

each guide washer comprises a continuous external peripheral edge, and the two external edges are adjacent, so as to close off the external periphery of the damping device;

the external peripheral edge of one of the guide washers is extended axially towards the rear by a deflector which diverts the flow of oil towards the clutch;

the deflector forms an annular skirt which minimizes the axial space between the external periphery of the damping device and the turbine wheel;

the deflector is formed by an external radial extension of the rear guide washer in a single piece;

the front guide washer and the damper plate each comprise axial drillings, which are arranged roughly axially opposite each other, with a view to facilitating the circulation of the flow of oil, which has passed through the clutch, to the discharge channel (V2);

the turbine hub comprises axial passages, close to its internal periphery, with a view to facilitating the circulation of the flow of oil, which has passed through the clutch, to the discharge channel (V2);

the axial passages are produced in the form of axial grooves.

Other characteristics and advantages of the invention will emerge from a reading of the following detailed description, for an understanding of which reference will be made to the accompanying drawings, amongst which:

FIG. 5 is a view similar to that of FIG. 1 which depicts a fourth embodiment of the invention in which the guide washers are solid;

FIG. 8 is a view similar to that of FIG. 1 which depicts a fifth embodiment of the invention in which the damper is equipped with a deflector;

In the following description, identical, similar or analogous components are designated by the same reference numbers.

In order to facilitate understanding of the description and claims, use will be made non-limitingly of the orientations "front" and "rear" corresponding respectively to the left and right in FIG. 1 and similar figures, and the orientations "axial-radial" and "external-internal" with respect to the rotation axis X-X of the hydrokinetic coupling appliance.

Figure 1:
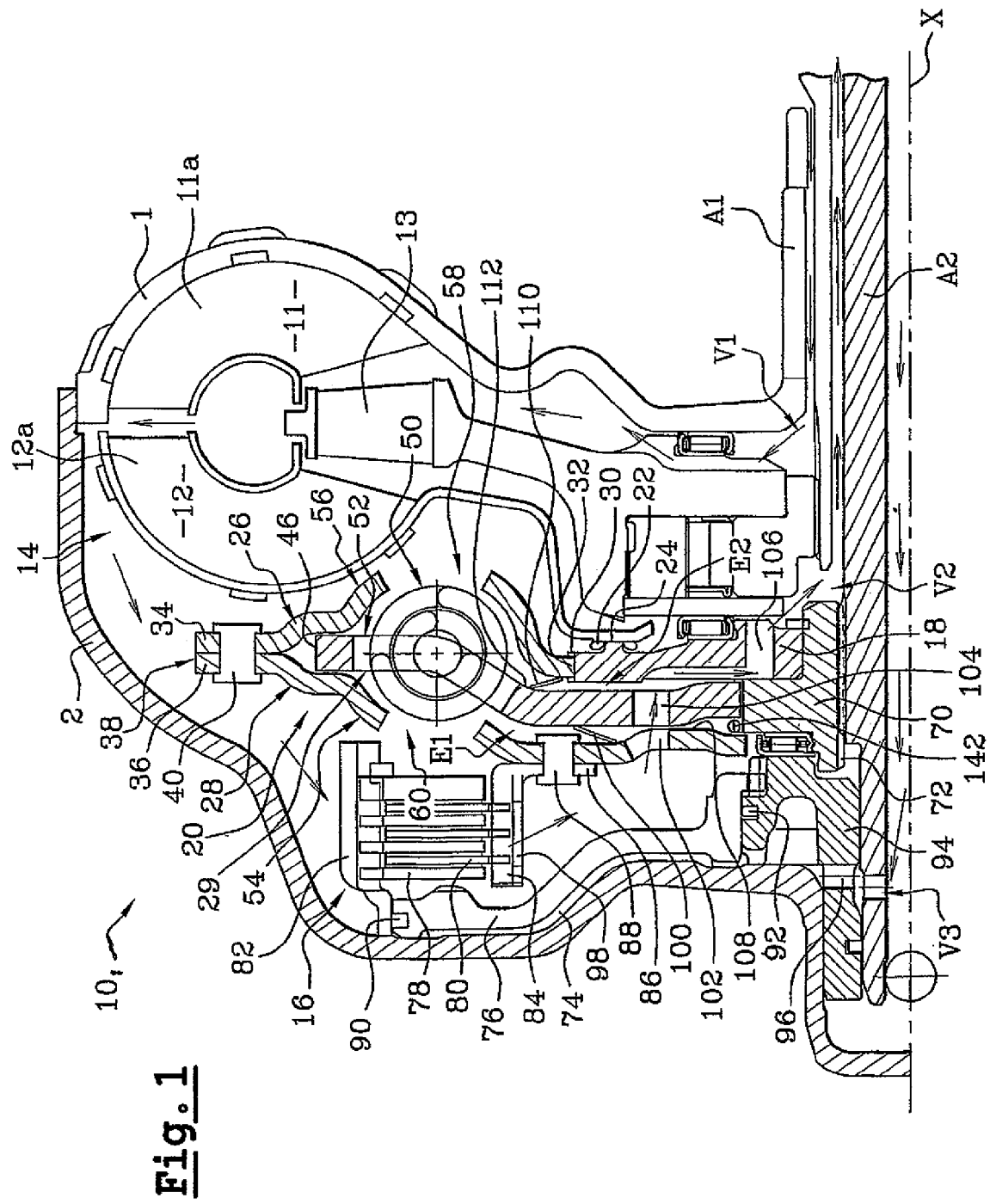
FIG. 1 is a half view in axial section which depicts a hydrokinetic coupling appliance according to a first embodiment of the invention, which comprises two elastic sealing washers and in which the rear elastic washer is interposed between the damper plate and the rear guide washer of the damper.

As is known from the state of the art, a hydrokinetic coupling device (or hydrokinetic coupling appliance) $10_1$ according to a first embodiment of the invention as illustrated in FIG. 1 comprises, arranged in the same sealed casing, in two parts in the form of respectively front 2 and rear 1 shells, filled with a fluid such as oil, a torque converter 14 and a lock-up clutch 16.

The shells 1, 2 are preferably assembled by welding.

The torque converter 14 comprises a rear impeller wheel 11, a front turbine wheel 12, and a central reaction wheel 13.

The impeller wheel 11 has blades 11a which are carried by the rear shell 1 which is sealingly fixed to the front drive shell 2. The shell 1 is able to be rotationally connected to a driving shaft A1.

The turbine wheel 12 also comprises blades 12a which face the blades 11a of the impeller wheel 11, and the turbine wheel is rotationally connected to a turbine hub 18 which is able to be rotationally connected to a driven shaft A2, coaxial with the axis X-X of the hydrokinetic coupling device $10_1$, by means here of a damping device 20.

In the case of an application to a motor vehicle, the driving shaft A1 consists of the crankshaft of the internal combustion engine of the vehicle, whilst the driven shaft A2 consists of the input shaft of the vehicle transmission, connected to gear ratio change means.

The turbine wheel 12 is here rotationally fixed, by a connection without play, to the turbine hub 18. The connection between the turbine wheel 12 and the turbine hub 18 is here achieved by friction welding, between a front radial surface 22 of the internal periphery of the turbine wheel 12 and a rear radial surface 24 of the turbine hub 18, axially facing.

Naturally the connection between the turbine wheel 12 and the turbine hub 18 can be achieved also by other means, for example by riveting or crimping.

The turbine hub 18 is designed to be rotationally connected to the driven shaft A2 by means of the damping device 20 or damper, which comprises an input element 26, 28 and an output element 29.

The input element of the damper 20 consists here of guide washers 26, 28, one of which, referred to as the rear guide washer 26, is rotationally connected without play by meshing with the turbine hub 18.

To this end, the external peripheral edge of the turbine hub 18 comprises teeth 30 which extend radially towards the outside and which are designed to cooperate with complementary teeth 32 carried by the internal peripheral edge of the rear guide washer 26.

It will be noted that the axial thickness of the teeth 30 of the turbine hub 18 is greater than the axial thickness of the teeth 32 of the rear guide washer 26, so that the rear guide washer 26 has axial freedom in order to move forwards or backwards, whilst keeping contact by meshing between its teeth 32 and the teeth 30 on the turbine hub 18.

Figure 2:
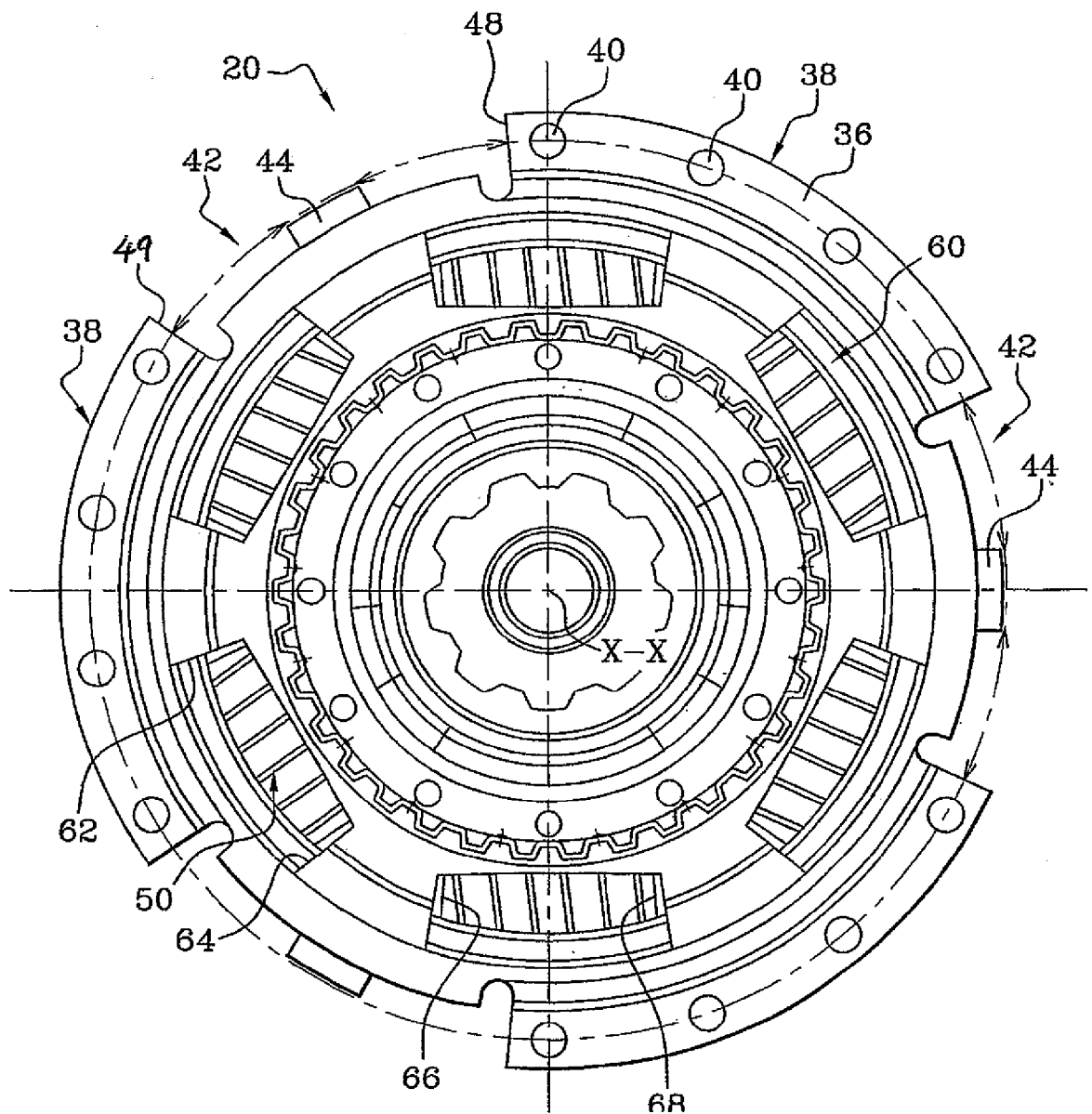
FIG. 2 is a front view which depicts the damper of FIG. 1.

The guide washers 26, 28 are rotationally fixed to one another by their external peripheral edges 34, 36, which comprise adjacent angular sectors 38, regularly distributed about the axis X-X, as can be seen in FIG. 2.

The adjacent angular sectors 38 are pressed against one another through their facing radial faces, here by means of rivets 40.

The pressed-together angular sectors 38 define stop members provided to delimit circumferentially between them guidance and stop notches 42, which are each designed to allow the angular movement of an associated radial lug 44, formed radially in line with an external peripheral edge 46 of a damper plate 29 forming the output element of the damper 20.

Each notch 42 comprises two circumferentially opposed radial edges 48, 49, which form stop surfaces for the associated radial lug 44.

The coming into abutment of the radial lugs 44 against the stop surfaces 48, 49 therefore determines a relative angular stop position between the guide washers 26, 28 and the damper plate 29.

Thus the torque transmitted by the turbine wheel 12 to the turbine hub 18 is transmitted to the guide washers 26, 28 forming the input element of the damper 20, and then to the damper plate 29, forming the output element of the damper 20, by means of circumferentially acting elastic members 50, after an angular movement of the guide washers 26, 28 as far as their angular stop position with the damper plate 29.

The circumferentially acting elastic members 50 are interposed between the guide washers 26, 28 and the damper plate 29. To do this, the damper plate 29 comprises windows 52 in which the elastic members 50 are mounted.

The guide washers 26, 28 also each comprise a central guide part 54, 56 which is provided with windows 58, 60 arranged in line with the windows 52 in the damper plate 29.

The elastic members 50 are in abutment respectively on the radial edges 62, 64 of the windows 58, 60 in the guide washers 26, 28 and on the radial edges 66, 68 of the windows 52 in the damper plate 29. The elastic members 50 are held axially by the circumferentially oriented edges of the windows 58, 60 in the guide washers 26, 28.

The elastic members 50 are thus acted on circumferentially between the input 26, 28 and output 29 elements of the damper 20, to the extent of a relative angular movement determined by the circumferential movement of the radial lugs 44 of the damper plate 29 in the notches 42 in the guide washers 26, 28, as far as an angular stop position.

The damper plate 29 is rotationally fixed, by meshing without play, to an output hub 70 which is rotationally connected, here by means of flutes 72, to the driven shaft A2.

Naturally, according to a variant embodiment (not shown) the damper plate 29, forming the output element of the damper 20, can be produced in a single piece with the output hub 70.

The hydrokinetic coupling device $10_1$ comprises, at the front, a sealed chamber 74 which is delimited axially by the front shell 2 of the casing and by a piston 76. The piston 76 is able to move axially so as to be able to come to axially clamp, under the action of the pressure of the oil in the chamber 74, the clutch 16, here of the multi-disc type.

As depicted in FIG. 1, such a clutch 16 comprises a plurality of plates 78 and friction discs 80, interposed axially between two successive plates 78, each friction disc 80 being provided with friction linings on its front and rear faces.

The plates 78 comprise, at their external radial periphery, teeth or other means suitable for rotationally connecting the plates 78 to a first connecting piece 82 by cooperation of shapes. The first connecting piece 82 is rotationally fixed to the shell 2, to which it is for example attached by welding.

The discs 80 comprise, in a similar manner to the plates 78, meshing means, at their internal radial periphery, which provides the rotational connection with a second connecting piece 84, which is rotationally fixed to the input of the damper 20, for example the front guide washer 28.

The second connecting piece 84 comprises here a radial portion 86 at its rear axial end, which is fixed to the front face of the front guide washer 28 by means of rivets 88.

In a variant, the second connecting piece 84 can be fixed to the front guide washer 28 by other means, in particular by friction welding.

The piston 76 comprises, at its external radial periphery, an annular groove in which first dynamic sealing means are mounted, such as a segment 90, which cooperates with a facing axial surface of the first connecting piece 82 and, at its internal radial periphery, a surface able to cooperate with second dynamic sealing means, such as a segment 92, which is mounted in an annular groove in a hub, or centering device 94, which is surrounded by the piston 76, with which it is rotationally connected by meshing.

The dynamic sealing means 90, 92 thus delimit the chamber 74, which is supplied with oil by a hollow shaft, here the driven shaft A2, with suitable radial passages 96 being provided in the centering device 94.

It should be noted that the appliance here is of the "three-channel" type, that is to say comprises a first channel V1 supplying the hydraulic circuit of the converter 14 and a second outlet channel V2 and a third channel V3 supplying the chamber 74 in order to move the piston 76 axially, this third channel V3 being independent of the first V1 and second V2 channels of the converter 14.

The conventional functioning of the hydrokinetic coupling device $10_1$ will now be explained.

In a first operating phase, referred to as the "converter phase", the torque of the driving shaft A1 is transmitted to the impeller wheel 11, which, by circulation of oil between the blades 11a and 12a, drives the turbine wheel 12.

During the converter phase, the damper 20 takes practically no part in the damping of the torsion vibrations or oscillations issuing in particular from the regular rotations of the engine. This is because the torsion vibrations or oscillations are filtered principally in the oil by the converter 14, since the transmission of the engine torque is effected by means of the kinetic energy of the oil in the converter 14, the damper 20 merely transmitting the torque from the turbine wheel 12 to the output hub 70.

In a second phase, referred to as the "coupling phase", the sealed chamber 74 of the casing 1, 2 is supplied so that the piston 76 exerts an axial pressure towards the rear, against the clutch 16, under the action of the pressure of the oil in the chamber 74, in order to couple the driving A1 and driven A2 shafts.

The clutch 16 is generally activated after the starting of the vehicle and after the hydraulic coupling of the driving A1 and driven A2 shafts, in order to avoid the loss of efficiency caused in particular by slip phenomena between the turbine 12 and impeller 11 wheels.

In the engaged state, that is to say when the piston 76 clamps the friction discs 80 by means of the multi-disc clutch 16, the torque of the driving shaft A1 is transmitted first to the guide washers 26, 28, then to the damper plate 29, by means of the elastic members 50.

The elastic members 50 damp the torsion oscillations and then, after angular movement of the connection with play between the guide washers 26, 28 and the damper plate 29 of the damper 20, the torque is transmitted to the damper plate 29, which is rotationally connected to the driven shaft 82, by means of the hub 70.

For more details with regard to the implementation and functioning of the hydrokinetic coupling device $10_1$, reference can be made to one or other of the documents FR-A-2.765.939 and U.S. Pat. No. 5,975,561.

The various embodiments of the invention will now be described, describing principally the differences which distinguish each embodiment with respect to another.

In accordance with the teachings of the invention, the hydrokinetic coupling device $10_1$ comprises means for restricting the circulation of oil in a roughly radial direction, at least inside the front axial space E1, which is situated between the front guide washer 28 and the damper plate 29, so as to promote the circulation of oil, from the supply channel V1 the discharge channel V2, through the lock-up clutch 16.

In a conventional manner, the lock-up clutch 16 comprises for this purpose radial drillings 98 which are produced in the first 82 and second 84 connecting pieces, so as to allow the radial circulation of oil through the clutch 16, between the plates 78 and the friction discs 80.

The circulation of oil through the clutch 16 cools the clutch 16, in particular when the clutch 16 is engaged, or semi-engaged, and produces slip between the plates 78 and the friction discs 80, producing heating.

In accordance with a first embodiment of the invention, which is depicted in FIG. 1, the damper 20 comprises an axial-effect front elastic washer 100, which is interposed axially between the front guide washer 28 and the damper plate 29.

This elastic washer 100 is here a frustoconical washer which is in substantially continuous axial abutment, circumferentially on each opposite face respectively of the front guide washer 28 and damper plate 29.

Advantageously, the front elastic washer 100 is disposed radially inside, with respect to the elastic members 50.

The front elastic washer 100 thus forms a substantially sealed barrier which prevents the circulation of oil radially inwards, in the front axial space E1.

This is because the flow of oil coming from the supply channel V1, which circulates between the front shell 2 and the damper 20, enters the front axial space E1 passing through the windows 60, or passing through the notches 42. This flow of oil is blocked by the front elastic washer 100, which prevents it from being directed to the discharge channel V2. Consequently the majority of the flow of oil will take an easier path, which passes through the clutch 16.

The "blocking" of the oil in the front axial space E1 therefore causes an increase in the flow of oil through the clutch 16, which improves the cooling of the clutch 16.

According to the embodiment depicted here, the front guide washer 28 is extended radially towards the inside, roughly as far as the output hub 70.

In order to promote the flow of oil, which passes through the clutch 16, to the discharge channel V2, a series of axial drillings 102, 104, 106 are advantageously provided respectively in the front guide washer 28, in the damper plate 29 and in the turbine hub 18.

The axial drillings 102, 104, 106 in each series are for example angularly distributed in a regular manner.

The axial drillings 102 in the front guide washer 28 are disposed radially inside, with respect to the front elastic washer 100.

The turbine hub 18 comprises here grooves which extend radially in its front face and which allow "connection" between the axial drillings 104 in the damper plate 29 and the axial drillings 106, the latter being offset radially towards the inside with respect to the axial drillings 104.

Figure 9:
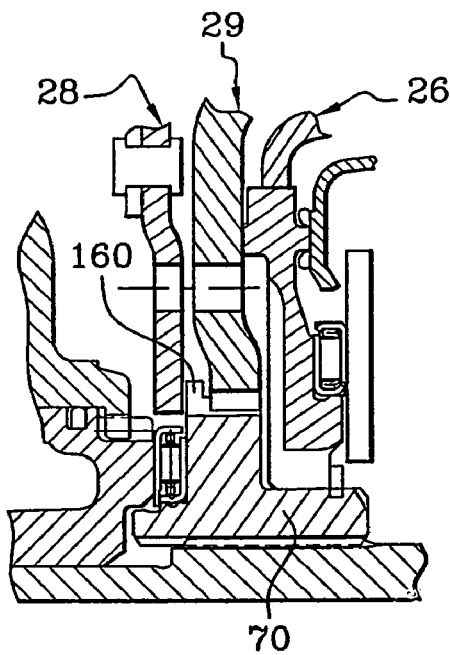
FIG. 9 is a view similar to that of FIG. 4 which depicts an embodiment of the axial stop means in the form of a rim carried by the output hub of the coupling appliance.
Figure 10:
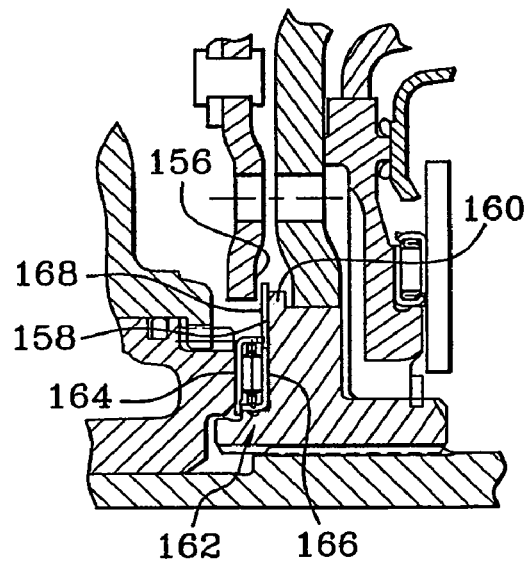
FIG. 10 is a view similar to that of FIG. 1 which depicts an embodiment of the axial stop means using the rear radial plate of a needle thrust bearing.
Figure 11:
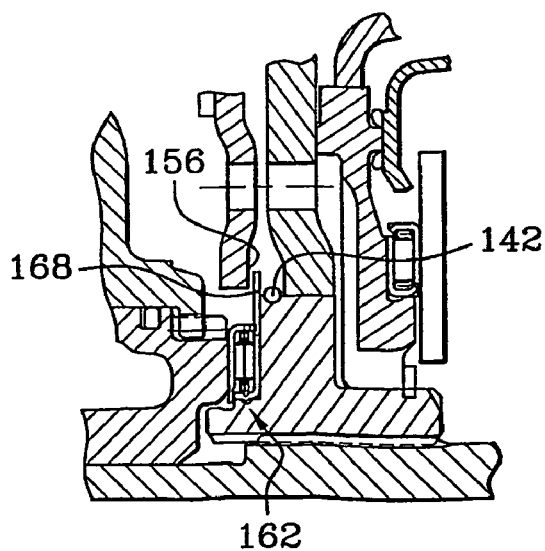
FIG. 11 is a view similar to that of FIG. 1 which depicts an embodiment of the axial stop means using a ring and a radial plate.

According to a variant embodiment which is depicted in FIGS. 9 to 11, the axial passages 106 can be produced in the form of axial grooves, which are produced in the internal periphery of the turbine hub 18. These axial grooves are for example angularly distributed in a regular manner.

Such grooves can easily be produced by machinery, which reduces the cost of manufacturing the turbine hub 18.

Advantageously, the front guide washer 28 comprises an annular protrusion 108, convex towards the rear, which can be produced by pressing, and which allows the centering of the front elastic washer 100.

Naturally, according to a variant embodiment, the centering protrusion 108 can be interrupted circumferentially, so as to form angularly distributed centering sectors.

Preferably, according to the first embodiment, the damping device 20 comprises a rear elastic washer 110, of the same type as the front elastic washer 100, which is interposed axially, in the rear axial space E2, between the damper plate 29 and the rear guide washer 26.

The rear elastic washer 110 is arranged here radially between the elastic members 50 and the teeth 32 on the rear guide washer 26.

The rear elastic washer 110 is here centered on the damper plate 29 by means of an axial recess 112 formed in the damper plate 29.

In the same way as the front elastic washer 100, the rear elastic washer 110 forms a barrier against the flow of oil, which comes from the supply channel V1, and which circulates between the damper 20 and the turbine wheel 12.

By virtue of the two elastic washers 100, 110, overall, the only path possible for the oil, between the supply channel V1 and the discharge channel V2, passes through the clutch 16 which ensures the circulation of a large quantity of oil through the clutch 16, and therefore good cooling of the clutch 16.

The circulation of oil in the hydrokinetic coupling device $10_1$ is illustrated, in FIG. 1, by arrows.

It will be noted that the invention also applies to a hydrokinetic coupling device in which the direction of circulation of the oil is reversed compared with that depicted here.

It should be noted that the elastic washers 100, 110 contribute to the damping of the torsion oscillations in the hydrokinetic coupling device $10_1$, since they form friction elements between the guide washers 26, 28 and the damper plate 29.

In addition, the elastic washers 100, 110 participate in the axial positioning of the elements of the damper 20 in the appliance 10, compensating for the axial play.

As the washers 100, 110 are elastic, the seal is maintained, even in the case of axial movement of the damper plate 29 with respect to the guide washers 26, 28.

To improve their hardness, the elastic washers 100, 110 can be treated, for example by carbo-nitriding.

The edges of the elastic washers 100, 110 which are in contact with the guide washer 26, 28 associated with the damper plate 29 are preferably rounded, so as to prevent damage to the surfaces in contact.

It should be noted that, in the first embodiment, a flow of oil can circulate in the rear axial space E2, passing between the teeth 30 on the turbine hub 18 and the teeth 32 on the rear guide washer 26. This flow of oil is slight, since the rear guide washer 26 meshes without play on the turbine hub 18 and because the flow of oil depends solely on the radial play between the teeth 30, 32. This is because the axial movement of the rear guide washer 26 with respect to the turbine hub 18 does not modify the cross-section of flow of the oil between the two elements 18, 26, unlike a hydrokinetic coupling device in which the teeth on the turbine hub 18 form blocks which extend axially forwards from the front radial surface of the turbine hub 18, such as the appliances depicted in the documents FR-A-2.765.939 and U.S. Pat. No. 5,975,561.

In these documents, it is noted that, the greater the axial movement of the rear guide washer 26 forwards, the greater the axial space created between the rear radial surface of the rear guide washer 26 and the front radial surface of the turbine hub 18. The cross-section of flow of the oil between the rear guide washer 26 and the turbine hub 18 therefore depends on the axial play between these two elements.

Another advantage of mounting the rear guide washer 26 on the turbine hub 18 through their respective internal and external peripheries lies in a lesser axial bulk.

This mounting also reduces the production costs, in particular because it is easier to produce the radial teeth 30, 32 by machining, at the external and internal periphery, respectively on the turbine hub 18 and the rear guide washer 26, than to produce teeth which extend axially forward, as in the documents cited above.

The advantageous embodiment of the meshing of the rear guide washer 26 on the turbine hub 18, which has just been described, can be used in other configurations of hydrokinetic coupling devices, in particular in a hydrokinetic coupling device which does not have any means for restricting the flow of oil in the damper 20.

Figure 3:
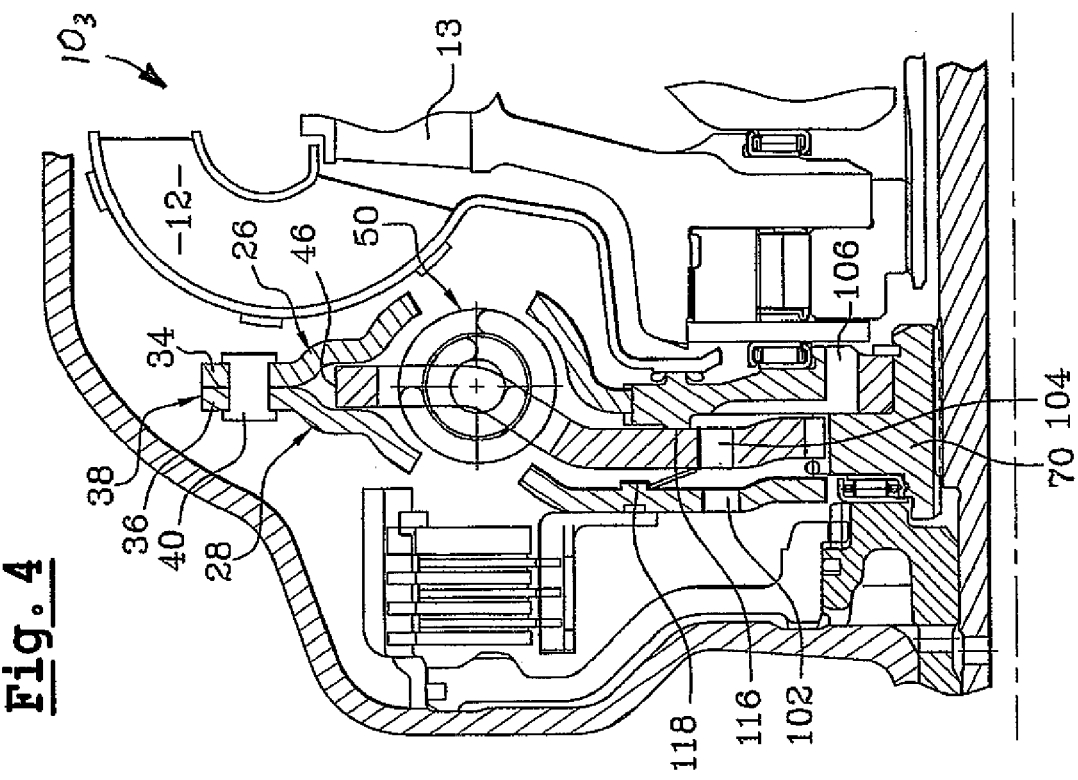
FIG. 3 is a view similar to that of FIG. 1 which depicts a second embodiment of the invention in which the rear elastic washer is interposed between the damper plate and the turbine hub of the converter.

With a view to improve the "seal" on the damper 20, in the rear axial space E2, a hydrokinetic coupling device $10_2$ according to a second embodiment, depicted in FIG. 3, makes provision for axially interposing the rear washer 110 between the damper plate 29 and a front radial surface 114 of the turbine hub 18.

The front face of the turbine hub 18 comprises here a countersink in which the rear elastic washer 110 is centered by its internal radial periphery.

The front face of the turbine hub 18, on which the rear elastic washer 110 bears, is preferably treated, for example by carbo-nitriding, so as to increase its hardness. This treatment can be carried out, for example, at the same time as the treatment of the teeth 30.

Figure 4:
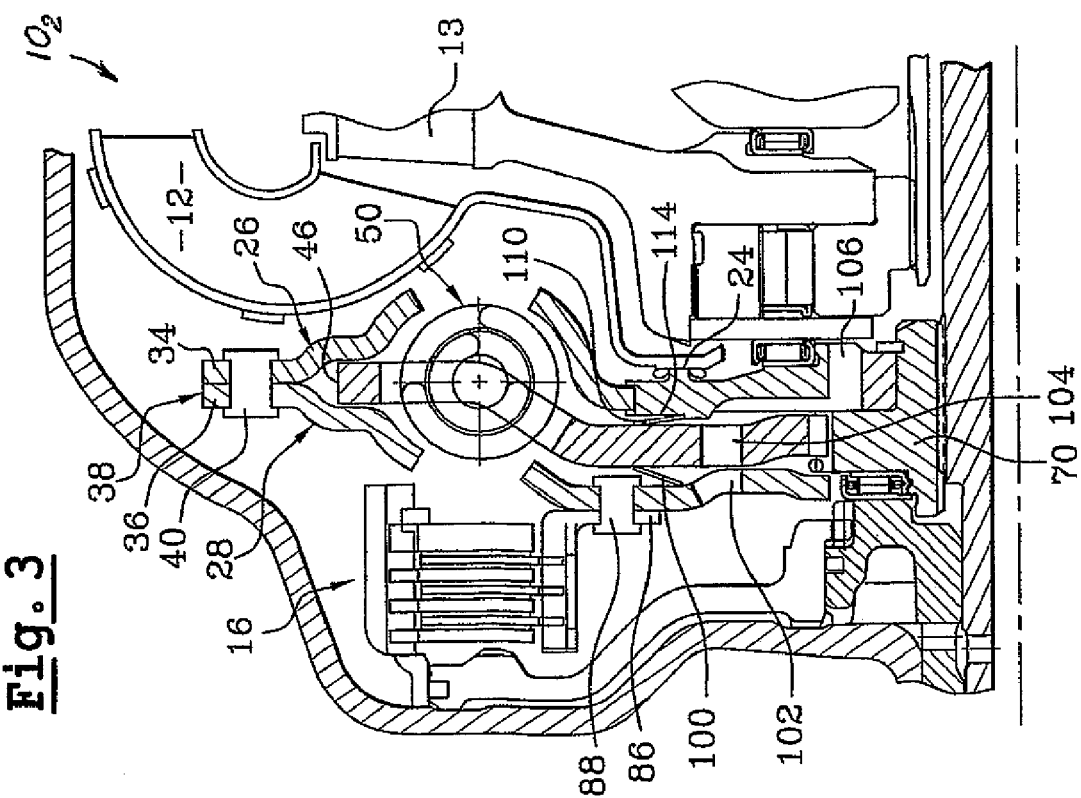
FIG. 4 is a view similar to that of FIG. 1 which depicts a third embodiment of the invention comprising a single elastic sealing washer.

FIG. 4 depicts a hydrokinetic coupling device $10_3$ according to a third embodiment in which the damper 20 comprises single elastic washer 100, in the front axial space E1, and in which the turbine hub 18 comprises a continuous annular radial surface 116, which is designed to be in axial abutment towards the front against the rear face of the damper plate 29.

The annular radial surface 116 of the turbine hub 18 being in continuous axial abutment against the damper plate 29, this prevents the radial circulation of the oil towards the inside, in the rear axial space E2.

The embodiment depicted here is provided with a variant embodiment of the means of centering the front elastic washer 100.

According to this variant, the front guide washer 28 comprises several "strikes", which form on the rear face of the washer 28 centering reliefs 118 which are distributed angularly, preferably in a regular manner.

The centering reliefs 118 are for example interposed circumferentially between two fixing rivets 88 for the second connecting piece 84.

Figure 6:
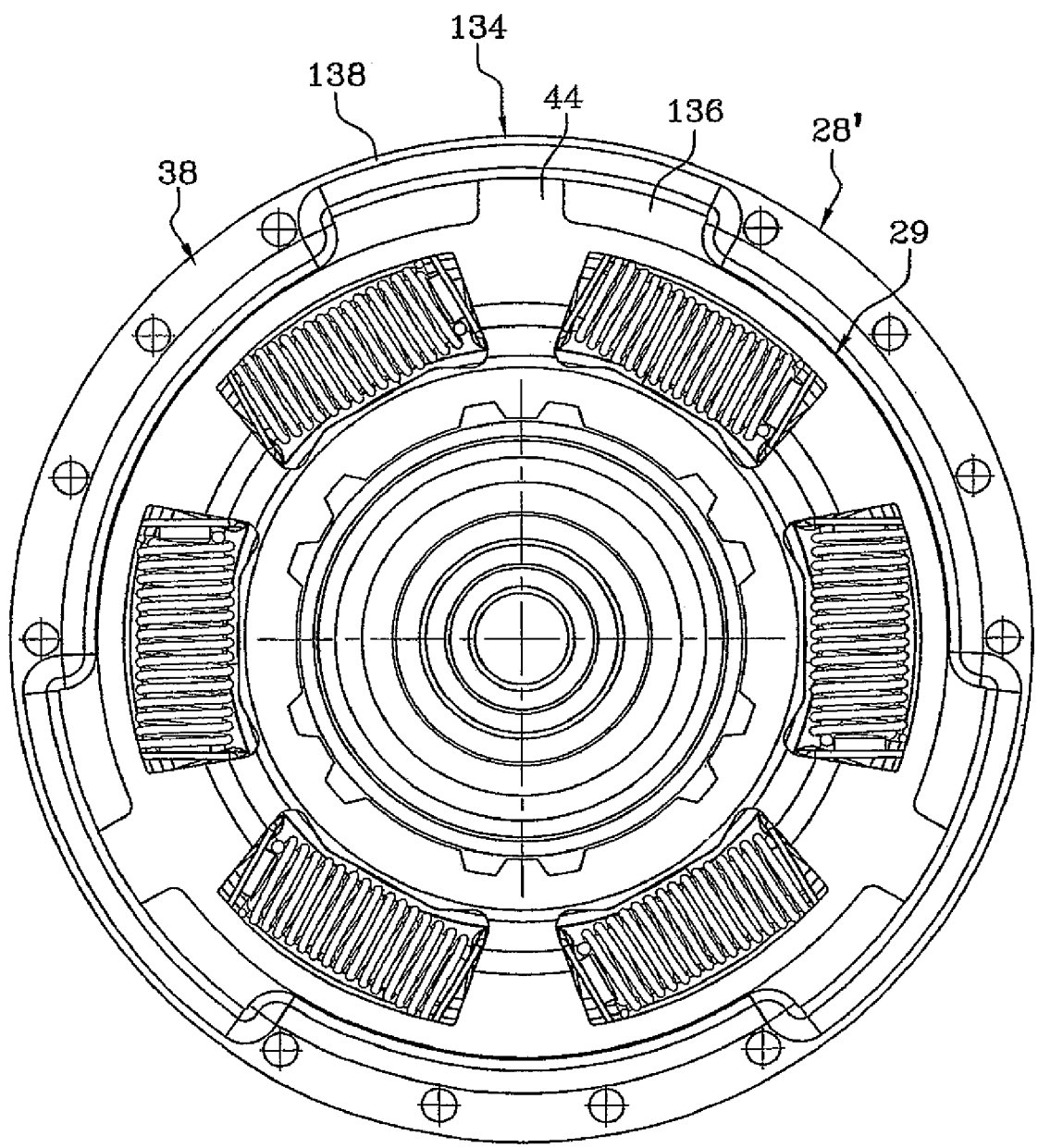
FIG. 6 is a rear view which depicts the damper of FIG. 5 without its rear guide washer.
Figure 7:
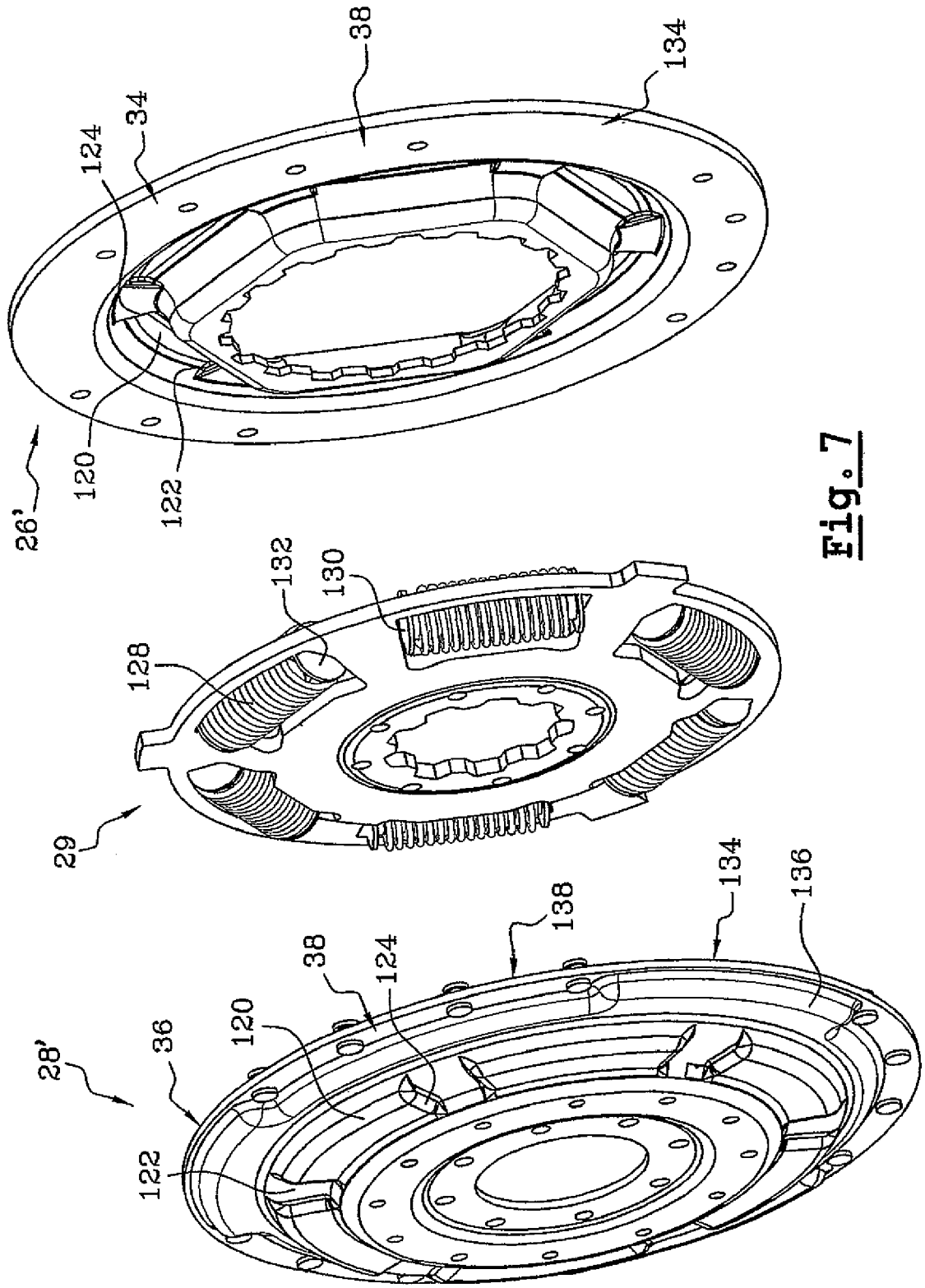
FIG. 7 is a view in exploded perspective which depicts the damper of FIG. 5.

In FIGS. 5 to 7, a fourth embodiment of the invention has been depicted in which a hydrokinetic coupling device $10_4$ comprises a damper 20' that is entirely "closed" and has no elastic washer 100, 110.

According to this embodiment, the damper 20' includes rear and front guide washers 26' and 28', respectively, such that the central guide part 54, 56 of each guide washer 26', 28' is solid, that is to say it has no window 58, 60.

The central guide part 54, 56 of each guide washer 26', 28' therefore forms, in line with the elastic members 50, complementary protrusions 120, in place of the windows 58, 60.

The protrusions 120 delimit, at each of their circumferential ends, a support surface 122, 124 for the elastic members 50, which overall has the same function as the radial edges 62, 64 of the windows 58, 60.

According to the embodiment depicted here, conventionally the elastic members 50 comprise, in each window 52 in the damper plate 29, a pair of coaxial helical springs 126, 128.

The guide washers 26', 28' must therefore comprise, for each pair of springs 126, 128, two circumferentially opposed support surfaces on which the two springs 126, 128 can bear.

For reasons of cost and simplicity of manufacture, it is wished to be able to conform the guide washers 26', 28' by pressing. This production method does not make it possible to sufficiently deform the sheet metal constituting the guide washers 26', 28', towards the damper plate 29, to enable the small-diameter springs 126, or internal springs, arranged coaxially in the large-diameter springs 128, or external springs, to come into abutment circumferentially against the support surfaces 122, 124.

Consequently, in this embodiment, there are provided, for each pair of springs 126, 128, two cups 130, 132 which come into abutment against the support surfaces 122, 124 of the protrusions 120, and which themselves form support surfaces for the springs 126, 128.

According to a variant embodiment (not shown) of the invention, it is possible to use external springs 128 produced from small-diameter wire, so that the internal springs can have turns with sufficient diameter to come into abutment on the support surfaces 122, 124, without it being necessary to provide cups 130, 132.

Advantageously, according to the fourth embodiment, the external peripheral edge 34, 36 of each guide washer 26', 28' is continuous and adjacent to the facing external peripheral edge 34, 36, so as to "close" the damper 20' at its external periphery.

Comparing the view in FIG. 6 and the view in FIG. 2, it can therefore be seen that the guide washers 26', 28' no longer have any cut-outs forming circumferential notches 42.

The external peripheral edge 34, 36 of each guide washer 26', 28' has angular sectors 38 which are riveted to the facing angular sectors 38.

According to the embodiment depicted here, the front guide washer 28 comprises angular sectors 134 which are interposed between two riveted angular sectors 38 and which each form a protrusion 136, convex towards the front, delimiting an axial space between the two guide washers 26', 28' to allow the angular movement of the associated radial lug 44 of the damper plate 29. The protrusions 136 replace the circumferential notches 42.

Each protrusion 136 is delimited radially towards the outside by a circumferential edge 138 which comes into axial abutment against a front face of the facing external peripheral edge 34 of the rear guide washer 26.

The external peripheral edge 34 of the rear guide washer 26 is here substantially flat over its entire circumference, that is to say the angular sectors 134 interposed between two riveted angular sectors 38 do not have any protrusion, facing the protrusions 136 of the front guide washer 28.

Thus the production of the guide washers 26, 28 is facilitated thereby. This is because the protrusions 136 are produced only in the front washer 28 so that, having regard to the manufacturing tolerances, in particular in pressing, it is easier to ensure a substantially continuous contact between the external peripheral edges 34, 36 of the two washers 26, 28 and to ensure a correct arrangement of the protrusions 136 with respect to the radial lugs 44 of the damper plate 29.

Naturally, according to a variant embodiment (not shown), it is possible to produce the protrusions 136 both in the front washer 28 and in the rear guide washer 26, so that the external peripheral edges 34, 36 of the two washers 26, 28 are substantially symmetrical with respect to a plane of symmetry transverse to the axis X-X.

In the embodiment depicted here, it can be seen that the passage of the flow of oil, radially from outside to inside, through the damper 20, is practically impossible, since there exists no opening allowing an easy flow of oil through the damper 20. The flow of oil through the clutch 16 is therefore assisted, since the latter has radial drillings for this purpose.

According to a variant embodiment (not shown) of the invention, the guide washers 26, 28 are closed, in line with the elastic members 50, as in the fourth embodiment, but the peripheral edges 34, 36 of the guide washers 26, 28 are produced as in the first embodiment, that is to say they have "open" notches 42.

In such a variant embodiment, front and rear elastic washers 100, 110 are advantageously provided, of the same type as those of the first embodiment, which are interposed axially between the damper plate 29 and the associated guide washer 26, 28, and which are disposed radially to the outside, with respect to the elastic members 50.

FIG. 8 depicts a hydrokinetic coupling device 10$_5$ according to a fifth embodiment of the invention, comprising a damper 20", which is similar to the previous one, but in which the rear guide washer 26" is similar to the rear guide washer 26 of the third embodiment, which is depicted in FIG. 4. The rear guide washer 26" is therefore not solid but comprises windows 58 in line with the elastic members 50.

Advantageously, an external peripheral edge 34" of the rear guide washer 26" is extended axially towards the rear by a deflector 140 in the form of an axial skirt.

The deflector 140 diverts the flow of oil towards the clutch 60.

The deflector 140 is preferably arranged so as to minimize the axial space between the external periphery of the damper 20" and the turbine wheel 12 so that the majority of the flow of oil flows towards the axial space between the front shell 2 and the external periphery of the damper 20" in order to pass through the clutch 16.

Naturally the deflector 140 can also equip a hydrokinetic coupling device of the present invention in which the two guide washers are solid, like the one which is depicted in FIGS. 5 to 7.

In the variant embodiment of the hydrokinetic coupling device of the present invention which is depicted in the FIGS. 1, 3-5 and 8-11, the output hub 70 comprises, at the front, axial stop means cooperating with a portion of the front face of the damper 29 and with a portion of the rear face of the front guide washer 28 (or 28'), so as to hold the damping device of the present invention axially on the output hub 70.

These axial stop means, during the functioning of the hydrokinetic coupling device of the present invention, limit the axial movement of the damper plate 29 with respect to the output hub 70, towards the front.

These axial stop means also make it possible to assemble the damper on the output hub 70, before they are mounted in the hydrokinetic coupling device, so as to produce a subassembly which facilitates the transport of the damper and the output hub 70 as far as the place of their mounting in the hydrokinetic coupling device of the present invention.

In addition, the formation of such a subassembly facilitates the mounting of the output hub 70 and damper in the hydrokinetic coupling device of the present invention.

Naturally these axial stop means are unnecessary in the case where the damper plate 29 is produced in one piece with the output hub 70.

According to a first embodiment of the stop means which is depicted in particular in FIG. 8, the output hub 70 comprises a stop ring 142, or spring ring, which is mounted on the axial face 144 of its main section 146.

Main section 146 means here the section of the output hub 70 in which the teeth 148 meshing with the teeth 150 of the damper plate 29 are formed.

The stop ring 142, here with a circular axial section, is received in a peripheral groove 152 in the main section 146, arranged in the vicinity of the front axial end of the main section 146.

When the damper plate 29 is mounted on the output hub 70, the damper plate 29 is held axially towards the front, since it comprises, at its internal periphery, a radial surface portion 154 axially facing the stop ring 142.

During the transport of the subassembly formed by the damper 20 and the output hub 70, the damper plate 29 is also held axially towards the rear.

This is because the damper plate 29 is "trapped" between the two guide washers 26, 28, and the front guide washer 28 comprises, at its internal periphery, a radial surface portion 156 axially facing the stop ring 142, and here axially facing the external peripheral edge of the front radial surface 158 of the main section 146. The radial surface portion 156 is therefore able to come into axial abutment towards the rear against the front radial surface 158 of the main section 146.

It should be noted that the diameter of the internal periphery of the front guide washer 28 is less than the outside diameter of the main section 146 of the output hub 70, so that the radial surface portion 156 is arranged axially facing the front radial surface 158 of the main section 146.

During the functioning of the hydrokinetic coupling device of the present invention, it is found that, towards the rear, the damper plate 29 is held axially by the turbine hub 18, against which it comes into axial abutment before the front guide washer 28 comes into axial abutment against the front radial surface 158 of the output hub 70.

A second embodiment of the axial stop means is depicted in FIG. 9.

According to this second embodiment, the stop ring 142 is replaced by a radial peripheral extension, or rim 160, at the front axial end of the main section 146 of the output hub 70.

The rim 160 is preferably produced on the main section 146, before the teeth 148. To facilitate the manufacture of the output hub 70, the teeth 148 are then produced over the entire axial thickness of the main section 146, so that the rim 160 then has a profile, in transverse section, in the form of teeth. In fact each tooth 148 of the main section 146 then has, at its front axial end, a small external rim 160.

As with the first embodiment of the axial stop means, the diameter of the internal periphery of the front guide washer 28 is such that the front guide washer 28 has a radial surface portion 156 axially opposite at least the front radial surface of the rim 160.

According to a third embodiment, which is depicted in FIG. 10, the main section 146 of the output hub 70 has a rim 160 similar to that of the second embodiment.

Conventionally, the hydrokinetic coupling device of the present invention generally comprises bearing means 162 which are interposed axially between the centering device 94 and the front radial surface 158 of the main section 146. These bearing means 162 consist here of a needle thrust bearing comprising rolling elements mounted between two front 164 and rear 166 radial plates.

The rear radial plate 166 is for example crimped onto the output hub 70.

According to the third embodiment, the rear radial plate 166 comprises an external radial extension 168 which is adjacent to the front radial surface 158 of the main section 146 and which extends towards the outside, beyond the rim 160.

This third embodiment makes it possible in particular to increase the diameter of the opening formed by the internal periphery of the front guide washer 28 since the radial extension 168 forms an axial stop surface, facing the radial surface portion 156, which extends further towards the outside than the rim 160.

According to the fourth embodiment of the axial stop means, which is depicted in FIG. 11, the main section 146 of the output hub 70 comprises a stop ring 142 similar to that in FIG. 8, and a rear radial plate 166 similar to that in FIG. 10.

Naturally the embodiments described and depicted here constitute examples of implementation of the invention.

Other embodiments, not shown, can be envisaged, without departing from the field of the invention. In particular, the various embodiments depicted here can be combined with each other.

The invention claimed is:

1. A hydrokinetic coupling device, in particular for a motor vehicle, comprising:
   a casing formed from a first shell rotationally connecting a driving shaft and an impeller wheel;
   a turbine wheel fixed, by a connection without play, to a turbine hub which is able to be rotationally connected to a driven shaft;
   a clutch locking the coupling of the driving and driven shafts, comprising a piston, able to move axially in order to disengageably connect a second shell of the casing to the driven shaft, clamping at least one friction disc fixed firstly to the second casing shell by means of a first connecting piece and secondly to an input element of a damping device by means of a second connecting piece;
   the damping device comprising circumferentially acting elastic members interposed between rear and front guide washers forming the input element and a damper plate forming an output element and which is fixed to the driven shaft, the input and output elements being rotationally connected with a capacity for angular movement which is limited by stop members, and comprising a channel supplying the casing with fluid and a channel discharging the fluid,
   the damping device further comprising means for restricting the circulation of the fluid in a roughly radial direction, at least inside a front axial space of the damping device, situated between the front guide washer and the damper plate, so as to promote the circulation of fluid from the supply channel to the discharge channel through the lock-up clutch.

2. The coupling device according to claim 1, wherein the means for restricting the circulation of fluid comprise at least one axial-effect front elastic washer interposed axially between the damper plate and the front guide washer so as to form a barrier against the radial circulation of the fluid inside the front axial space of the damping device.

3. The coupling device according to claim 2, wherein the means for restricting the circulation of fluid comprise at least one axial-effect rear elastic washer interposed axially between the damper plate and one of the rear guide washer and the turbine hub and disposed radially inside with respect to the elastic members so as to form a barrier against the radial circulation of the fluid inside a rear axial space situated between the damper plate and the rear guide washer.

4. The coupling device according to claim 3, wherein each elastic washer is a frustoconical washer.

5. The coupling device according to claim 3, wherein each of the front and rear elastic washers is centered with respect to the axis by means of a complementary centering profile which is produced in the associated rear or front guide washer, or in the damper plate.

6. The coupling device according to claim 5, wherein the centering profile comprises several strikes forming, on the associated guide washer or on the damper plate, angularly distributed centering reliefs.

7. The coupling device according to claim 1, wherein the rear guide washer is fixed to the turbine hub.

8. The coupling device according to claim 7, wherein the rear guide washer and the turbine hub are rotationally integral by meshing, by means of teeth which are carried respectively by an internal periphery of the rear guide washer and by an external periphery of the turbine hub.

9. The coupling device according to claim 7, wherein the turbine hub comprises a continuous annular radial surface which comes into axial abutment against a rear face of the damper plate so as to prevent the radial circulation of the fluid inside a rear axial space.

10. The coupling device according to claim 1, wherein a central part of the front guide washer and/or a central part of the rear guide washer, which is situated in line with the elastic members, is solid, by virtue of which the fluid cannot flow in the axial space associated with one of the front guide washer and the rear guide washer by passing through the central part of the rear and front guide washer.

11. The coupling device according to claim 10, wherein the damping device comprises pairs of cups which are arranged in the central parts of the rear and front guide washers so as to form abutment surfaces for the circumferentially acting elastic members.

12. The coupling device according to claim 1, wherein each of the rear and front guide washer comprises a continuous external peripheral edge, and wherein the two external edges are adjacent, so as to close off an external periphery of the damping device.

13. The coupling device according to claim 1, wherein an external peripheral edge of one of the guide washers is extended axially towards the rear by a deflector which diverts the flow of oil towards the clutch.

14. The coupling device according to claim 13, wherein the deflector forms an annular skirt which minimizes the axial space between the external periphery of the damping device and the turbine wheel.

15. The coupling device according to claim 13, wherein the deflector is formed by an external radial extension of the rear guide washer in a single piece.

16. The coupling device according to claim 1, wherein the front guide washer and the damper plate each comprise axial drillings, which are arranged roughly axially opposite each other, with a view to facilitating the circulation of the flow of oil, which has passed through the clutch, to the discharge channel.

17. The coupling device according to claim 1, wherein the turbine hub comprises axial passages, close to an internal periphery thereof, with a view to facilitating the circulation of the flow of oil, which has passed through the clutch, to the discharge channel.

18. The coupling device according to claim 17, wherein the axial passages are produced in the form of axial grooves.

19. A hydrokinetic coupling device for a motor vehicle, comprising:
- a casing formed from a first shell rotationally connecting a driving shaft and an impeller wheel;
- a turbine wheel fixed by a connection without play to a turbine hub which is able to be rotationally connected to a driven shaft;
- a clutch locking the coupling of the driving and driven shafts, comprising a piston, able to move axially in order to disengageably connect a second shell of the casing to the driven shaft, clamping at least one friction disc fixed firstly to the second casing shell by means of a first connecting piece and secondly to an input element of a damping device by means of a second connecting piece;
- the damping device comprising circumferentially acting elastic members interposed between rear and front guide washers forming the input element and a damper plate forming an output element and which is fixed to the driven shaft, the input and output elements being rotationally connected with a capacity for angular movement which is limited by stop members, and comprising a channel supplying the casing with fluid and a channel discharging the fluid;
- the rear guide washer being fixed to the turbine hub;
- the damping device further comprising means for restricting the circulation of the fluid in a roughly radial direction, at least inside a front axial space of the damping device, situated between the front guide washer and the damper plate, so as to promote the circulation of fluid from the supply channel to the discharge channel through the lock-up clutch;
- the means for restricting the circulation of fluid comprising at least one axial-effect front elastic washer interposed axially between the damper plate and the front guide washer so as to form a barrier against the radial circulation of the fluid inside the front axial space of the damping device, and at least one axial-effect rear elastic washer interposed axially between the damper plate and a front face of the turbine hub and disposed radially inside with respect to the elastic members so as to form a barrier against the radial circulation of the fluid inside a rear axial space situated between the damper plate and the rear guide washer.

20. The coupling device according to claim 19, wherein a surface of the turbine hub liable to be in contact with the rear elastic washer and/or the rear elastic washer being treated to increasing hardness thereof.

* * * * *